(12) United States Patent
Gibb et al.

(10) Patent No.: US 7,654,587 B2
(45) Date of Patent: Feb. 2, 2010

(54) MECHANICAL PIPE COUPLING HAVING SPACERS

(75) Inventors: John Gibb, Beeton (CA); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 12/174,819

(22) Filed: Jul. 17, 2008

(65) Prior Publication Data

US 2008/0290652 A1 Nov. 27, 2008

Related U.S. Application Data

(63) Continuation of application No. 11/125,430, filed on May 10, 2005, now Pat. No. 7,401,819.

(60) Provisional application No. 60/571,596, filed on May 14, 2004.

(51) Int. Cl.
*F16L 17/00* (2006.01)

(52) U.S. Cl. .................. 285/373; 285/112; 285/367; 285/419

(58) Field of Classification Search ................ 285/112, 285/328, 367, 368, 373, 406, 419; 411/544, 411/546, 547
See application file for complete search history.

(56) References Cited

U.S. PATENT DOCUMENTS

| | | |
|---|---|---|
| 29,731 A | 8/1860 | Truss |
| 1,093,868 A | 4/1914 | Leighty |
| 1,987,235 A | 1/1935 | Janeway, Jr. |
| 2,020,156 A | 11/1935 | Muchnic |
| 2,473,102 A | 6/1949 | Krooss |
| 2,752,173 A | 6/1956 | Krooss |
| 3,905,623 A | 9/1975 | Cassel |
| 3,977,705 A | 8/1976 | Thiessen et al. |
| 4,391,458 A | 7/1983 | Blakeley |
| 4,403,378 A | 9/1983 | Engman |
| 4,471,979 A | 9/1984 | Gibb et al. |
| 4,506,418 A | 3/1985 | Viola et al. |
| 4,522,434 A | 6/1985 | Webb |
| 4,601,495 A | 7/1986 | Webb |

(Continued)

FOREIGN PATENT DOCUMENTS

DE  17 98 281 A1  9/1971

(Continued)

OTHER PUBLICATIONS

U.S. Appl. No. 12/174,803, filed Jul. 17, 2008 entitled "Mechanical Pipe Coupling Having Spacers", (Gibb et al).

*Primary Examiner*—James M Hewitt
*Assistant Examiner*—Jay R Ripley
(74) *Attorney, Agent, or Firm*—Ballard Spahr LLP

(57) ABSTRACT

A preassembled mechanical pipe coupling having spacers is disclosed. The coupling has a plurality of interconnectable segments that straddle the ends of pipe elements to be joined. The segments have arcuate surfaces that engage outer surfaces of the pipe elements. Spacers, positioned between the segments, maintain them in spaced apart relation sufficient to allow the pipe elements to be inserted between the segments. The segments have adjustably tightenable connection members for connecting the segments and drawing them to one another. When the connection members are tightened and the effect of the spacers is overcome, the arcuate surfaces are brought into engagement with the outer surfaces of the pipe elements.

8 Claims, 14 Drawing Sheets

U.S. PATENT DOCUMENTS

| | | | |
|---|---|---|---|
| 4,639,020 A | | 1/1987 | Rung et al. |
| 4,722,561 A | | 2/1988 | Heckethorn et al. |
| 4,776,362 A | * | 10/1988 | Domingue et al. ............ 137/59 |
| 4,861,075 A | | 8/1989 | Pepi et al. |
| 4,966,395 A | | 10/1990 | Hendrickson |
| 5,018,548 A | | 5/1991 | McLennan |
| 5,058,931 A | | 10/1991 | Bowsher |
| 5,280,970 A | | 1/1994 | Straub |
| 5,312,137 A | * | 5/1994 | Nee ........................... 285/14 |
| 5,758,907 A | | 6/1998 | Dole et al. |
| 5,971,001 A | * | 10/1999 | Andersson ............... 137/15.12 |
| 6,070,911 A | | 6/2000 | Namikawa et al. |
| 6,302,450 B1 | | 10/2001 | Dole et al. |
| 6,312,025 B1 | | 11/2001 | Wolfsdorf |
| 6,533,333 B1 | | 3/2003 | Radzik |
| 7,401,819 B2 | | 7/2008 | Gibb et al. |

FOREIGN PATENT DOCUMENTS

| | | |
|---|---|---|
| DE | 91 03 296 U1 | 6/1991 |
| DE | 43 09 330 A1 | 9/1994 |
| DE | 102 30 845 A1 | 2/2003 |
| EP | 0 412 642 | 2/1991 |
| EP | 0 427 880 A | 5/1991 |
| EP | 05 74 6767 | 8/2009 |

* cited by examiner

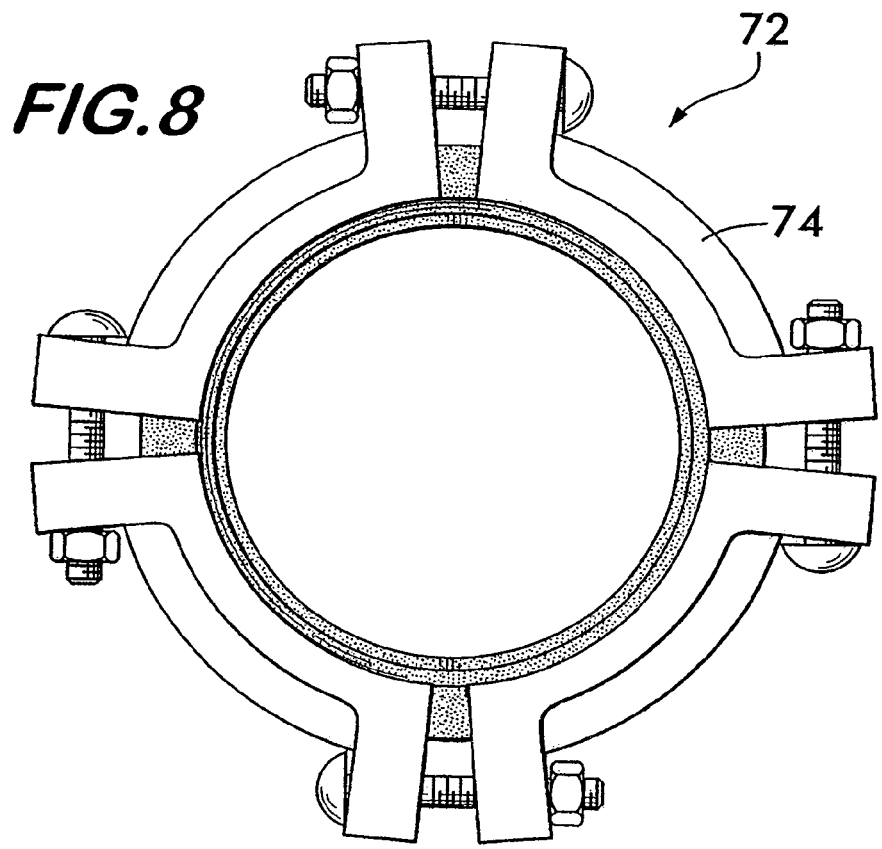
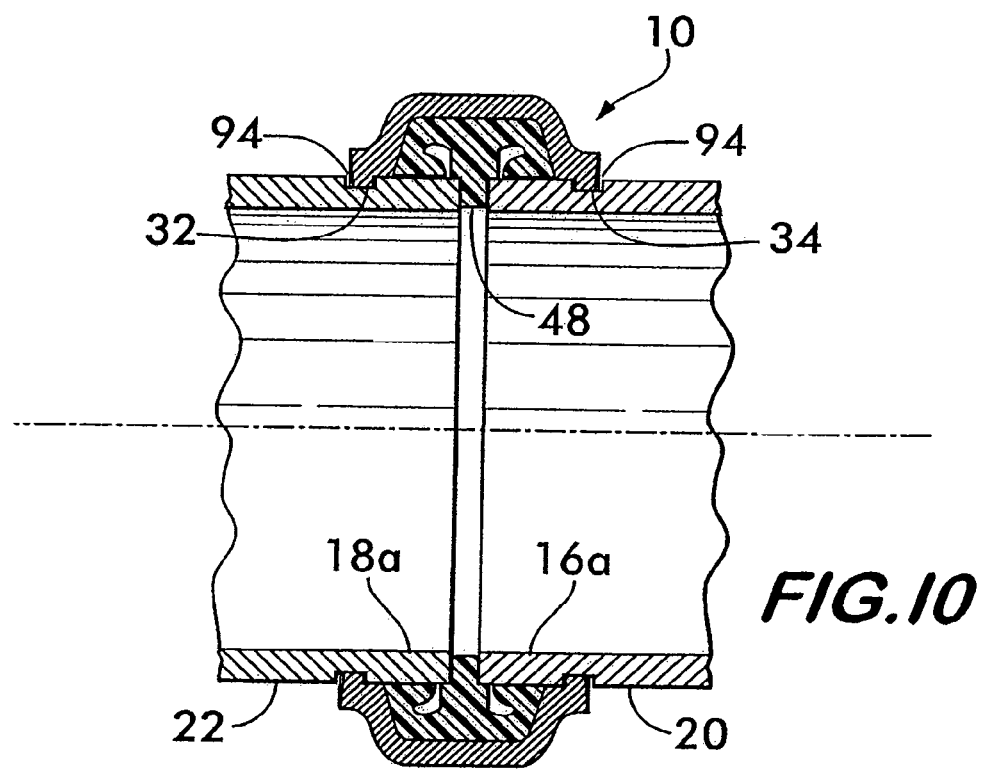

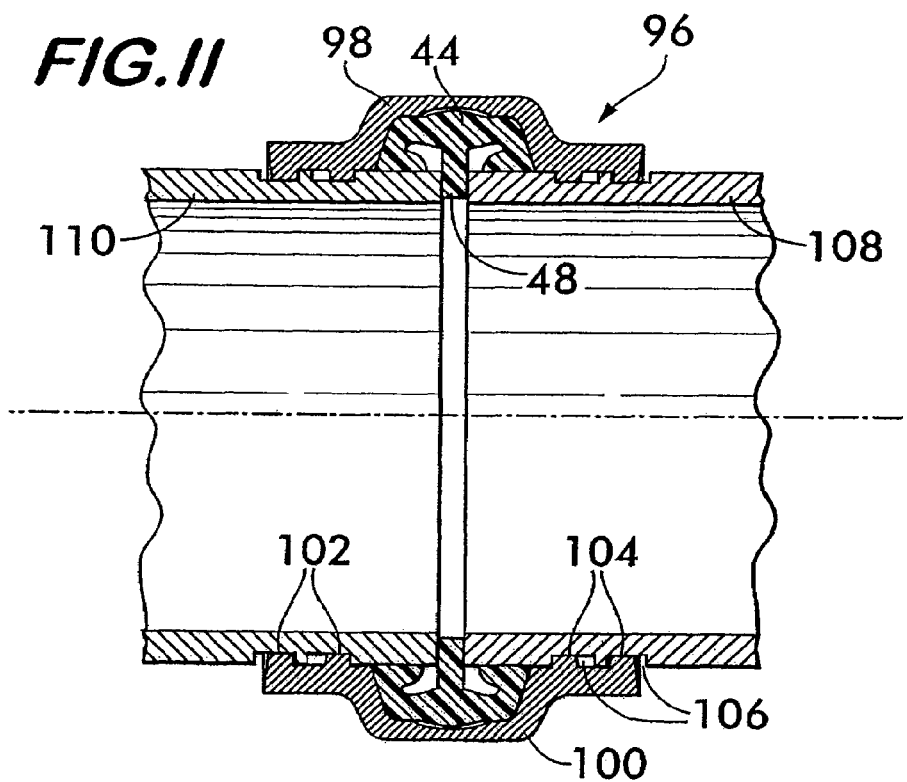
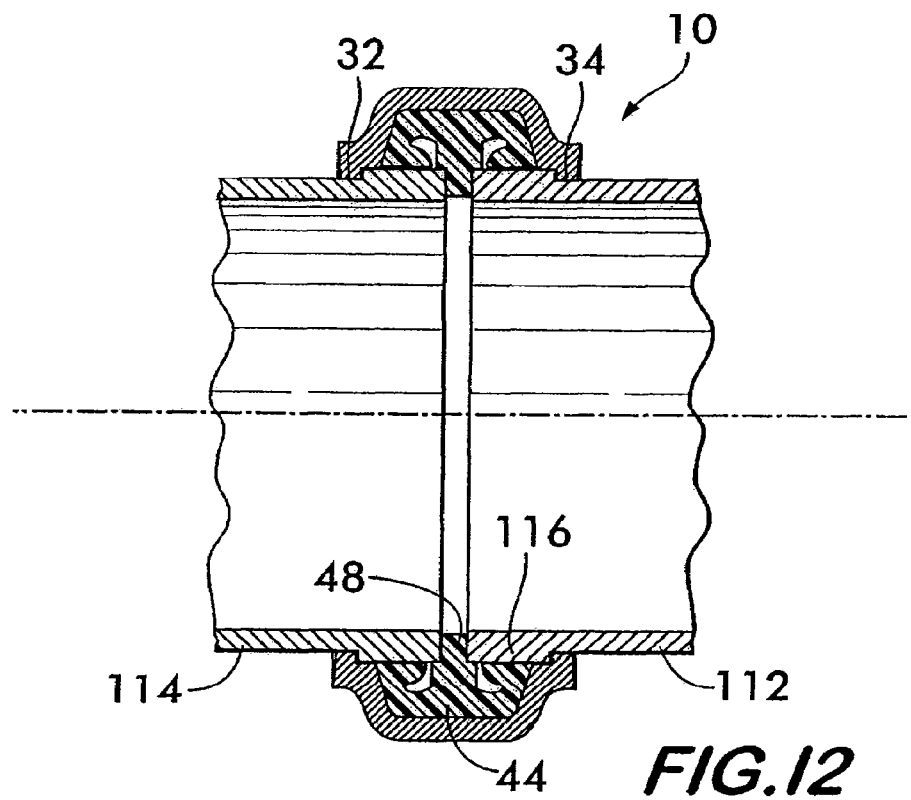

MECHANICAL PIPE COUPLING HAVING SPACERS

CROSS-REFERENCE TO RELATED APPLICATIONS

This application is a continuation of U.S. application Ser. No. 11/125,430, filed May 10, 2005, now U.S. Pat. No. 7,401,819, which claims priority to U.S. Provisional Application No. 60/571,596, filed May 14, 2004.

FIELD OF THE INVENTION

This invention concerns mechanical pipe couplings that have segments maintained in spaced apart relation using spacers.

BACKGROUND OF THE INVENTION

Mechanical couplings for joining pipe elements together end-to-end comprise interconnectable segments that that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult.

With the ring seal in place on both pipe elements, the segments are then placed one at a time straddling the ends of the pipe elements and capturing the ring seal against them. During placement, the segments engage the seal, the arcuate surfaces are aligned with the grooves when present, or with alignment marks made on the outside surfaces of the pipe elements, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and move when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns a pipe coupling positionable straddling facing end portions of a pair of pipe elements for securing the pipe elements together in end-to-end relationship. The end portions of the pipe elements have an outer surface of substantially cylindrical profile. The pipe coupling comprises a plurality of coupling segments. Each coupling segment has a pair of arcuate surfaces adapted to interface with the cylindrically profiled outer surfaces of the pipe elements. The arcuate surfaces are in spaced apart relation lengthwise of one another. Each coupling segment has connection members for adjustably connecting one coupling segment to another.

A spacer is positioned between the coupling segments. The spacer maintains the coupling segments in predetermined spaced apart relation sufficient to allow the end portions of the pipe elements to be inserted between the coupling segments in end-to-end relationship. The connection members are adjustably tightenable for drawing the segments together. The spacer is configured to allow for tightening of the connection members to permit the arcuate surfaces to engage the outer surfaces of the pipe elements when the portions of the pipe elements are inserted between the coupling segments in end-to-end relationship.

In one embodiment, the spacer is configured to be collapsible upon the application of a predetermined compressive force resulting from tightening of the connection members. Collapse of the spacer permits the arcuate surfaces to engage the outer surfaces of the pipe elements.

Preferably, the collapsible spacer comprises a tube positioned between the connection members. The tube has a circular cross section and may be formed from a polymer material. Lightweight metal tubes are also feasible. The tube may be corrugated or scored to facilitate collapse of the tube upon tightening of the connection members.

In another embodiment, the spacer is configured to be removable from between the segments. Removal of the spacer allows for tightening of the connection members permitting the arcuate surfaces to engage the outer surfaces of the pipe elements. The removable spacer preferably takes the form of a block-shaped body positioned between the connection members. The block-shaped body may be releasably attached to one of the connection members.

In a particular embodiment, the arcuate surfaces on the segments subtend an angle of less than 180° and have a radius of curvature greater than the radius of curvature of the outer surfaces of the pipe elements. The segments are deformable upon adjustable tightening of the connection members so as to conform the curvature of the arcuate surfaces to the outer surfaces of the pipe elements.

In another embodiment, the arcuate surfaces project radially inwardly from the segments. A pair of notches is formed in each of the arcuate surfaces proximate to each end of the segments. The notches provide clearance for insertion of the end portions of the pipe elements between the segments when the segments are in the predetermined spaced apart relationship.

In yet another embodiment, the segments are neither intentionally deformable nor are there clearance notches present, the coupling using the spacers only to allow the pipe elements to be inserted between the segments when in the spaced apart, pre-assembled configuration.

BRIEF DESCRIPTION OF THE DRAWINGS

FIGS. 6-7 and 8 are axial views of various pipe coupling embodiments according to the invention;

FIGS. 7A and 9-13 are longitudinal sectional views of pipe coupling embodiments according to the invention;

DETAILED DESCRIPTION OF THE EMBODIMENTS

Figure 1:
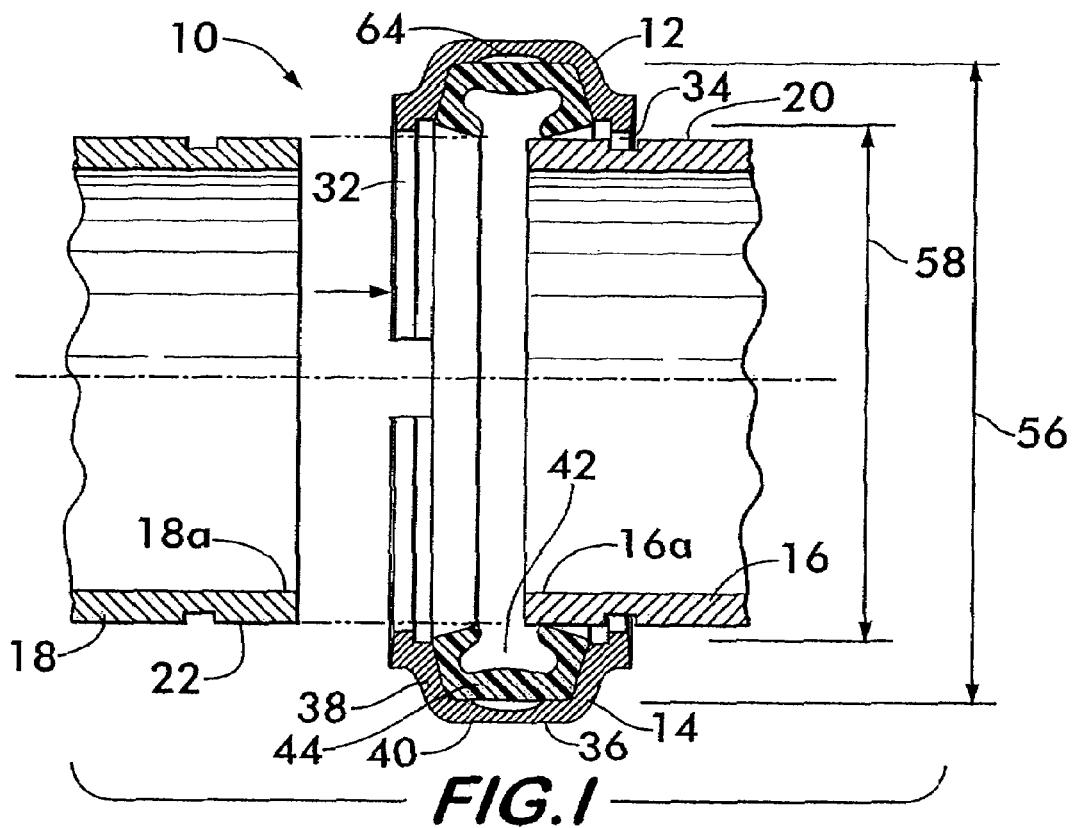
FIGS. 1-1B are longitudinal cross-sectional views of a deformable mechanical pipe coupling according to the invention.
Figure 2:
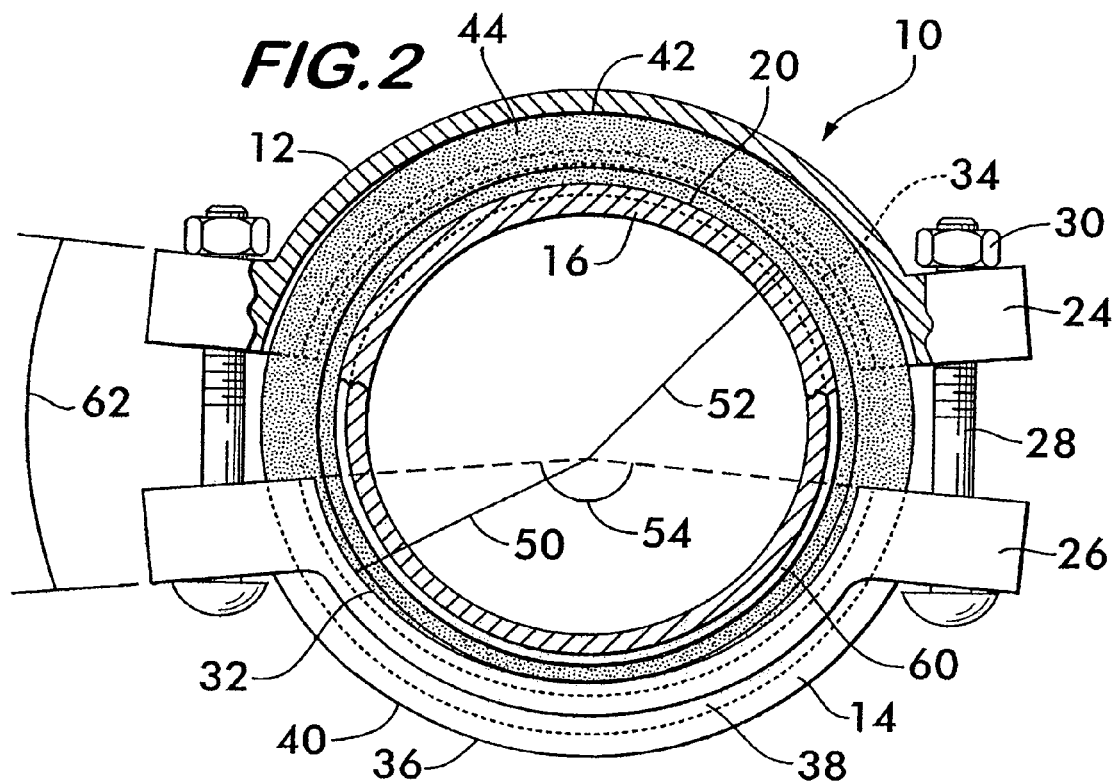
FIGS. 2 and 3 are partial cross-sectional views of the pipe coupling shown in FIG. 1.

FIGS. 1 and 2 show a pipe coupling 10 according to the invention. Coupling 10 is formed from coupling segments 12 and 14 which are interconnectable with one another to straddle end portions 16a and 18a of pipe elements 16 and 18 to secure the pipe elements together in end-to-end relationship. The end portions of the pipe elements have respective outer surfaces 20 and 22 of substantially cylindrical profile.

Interconnection of the coupling segments 12 and 14 is effected by connection members, preferably in the form of lugs 24 and 26 best shown in FIG. 2. The lugs are preferably positioned at each end of each segment and project outwardly from the segments. Lugs 24 and 26 are positioned in facing relation to one another and adapted to receive fasteners, preferably in the form of bolts 28 and nuts 30 which are adjustably tightenable and cooperate with the lugs 24 and 26 for adjustably connecting the coupling segments to one another as discussed in further detail below.

As best shown in FIG. 1, each segment 12 and 14 comprises a pair of arcuate surfaces 32 and 34. The arcuate surfaces are in spaced apart relation to one another and preferably project radially inwardly toward the pipe elements 16 and 18. The surfaces extend from a housing 36 having sidewalls 38 joined to a backwall 40, the sidewalls and backwall forming a channel 42 that receives a seal 44.

Figure 4:
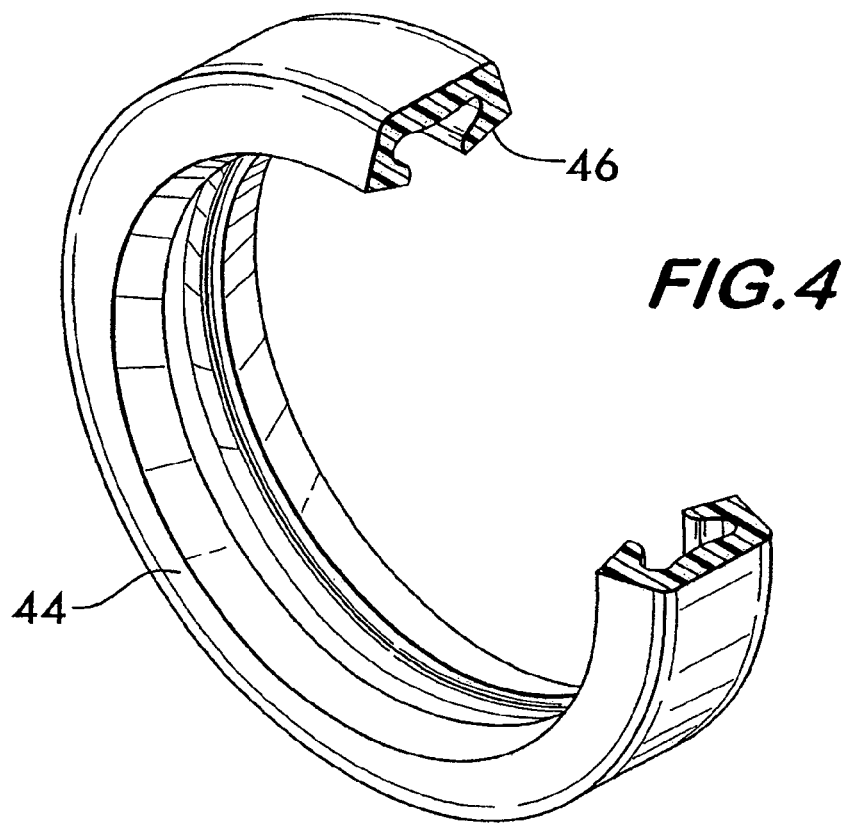
FIGS. 4 and 5 are perspective views, partially cut away, of seals used with pipe couplings according to the invention.
Figure 5:
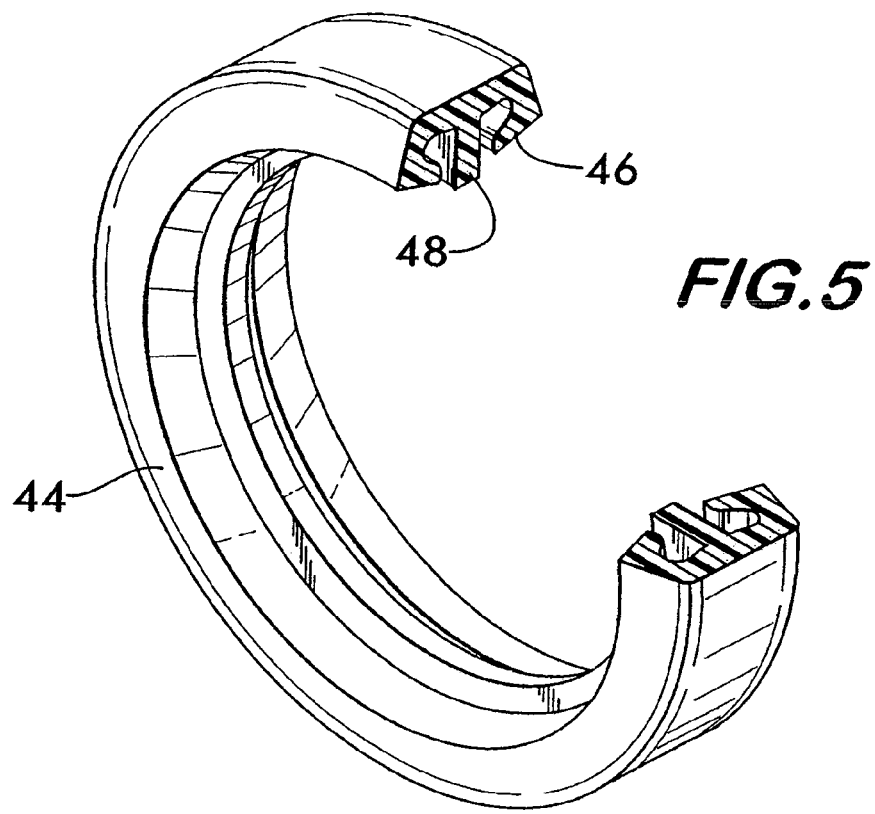

Examples of seals 44 are shown in FIGS. 4 and 5. Seal 44 is preferably a flexible, resilient ring formed from elastomeric material. The seal may have lips 46 that use the internal pressure within the pipes to increase the sealing force between the seal and the outer surfaces 20 and 22 of the pipe elements 16 and 18. As shown in FIG. 5, seal 44 may also have a tongue 48 positioned between the lips 46, the tongue extending circumferentially around the seal and projecting radially inwardly. Tongue 48 provides a stop surface that engages the ends of pipe elements 16 and 18 to ensure proper positioning of the seal 44 relatively to the pipe elements as described in detail below. Engagement of the pipe elements with tongue 48 also effects alignment of the arcuate surfaces with the grooves (if present), or with alignment marks on the outside surface of the pipe elements.

As illustrated in FIG. 2, arcuate surfaces 32 and 34 have radii of curvature 50 greater than the radii of curvature 52 of the outer surfaces 20 and 22 of pipe elements 16 and 18. Furthermore, the arcuate surfaces 32 subtend an angle 54 of less than 180°. Angles 54 between about 40° and about 179° are practical. As a result of this arcuate surface geometry, segments 12 and 14 may be pre-assembled separated from one another such that pipe elements 16 and 18 may be inserted directly into the coupling 10 as shown in FIG. 1 without first disassembling the coupling. This feature provides a significant advantage over prior art couplings which must be assembled onto the pipe ends piece by piece. Joining of the pipe ends with a coupling 10 according to the invention proceeds much more smoothly and quickly than with prior art couplings because the technician handles fewer pieces and does not have to thread nuts onto bolts. In the embodiment shown in FIG. 1, the seal 44 has an outer diameter 56 sized to hold the coupling segments 12 and 14 in spaced apart relation sufficient to allow the pipe ends to be inserted as described above. The seal inner diameter 58 is sized to receive the end portions 16a and 18a of the pipe elements simply by pushing the coupling over the pipe elements or by inserting the pipe elements into the coupling. Other embodiments having different features for supporting the segments in spaced relation are described below.

Figure 1A:
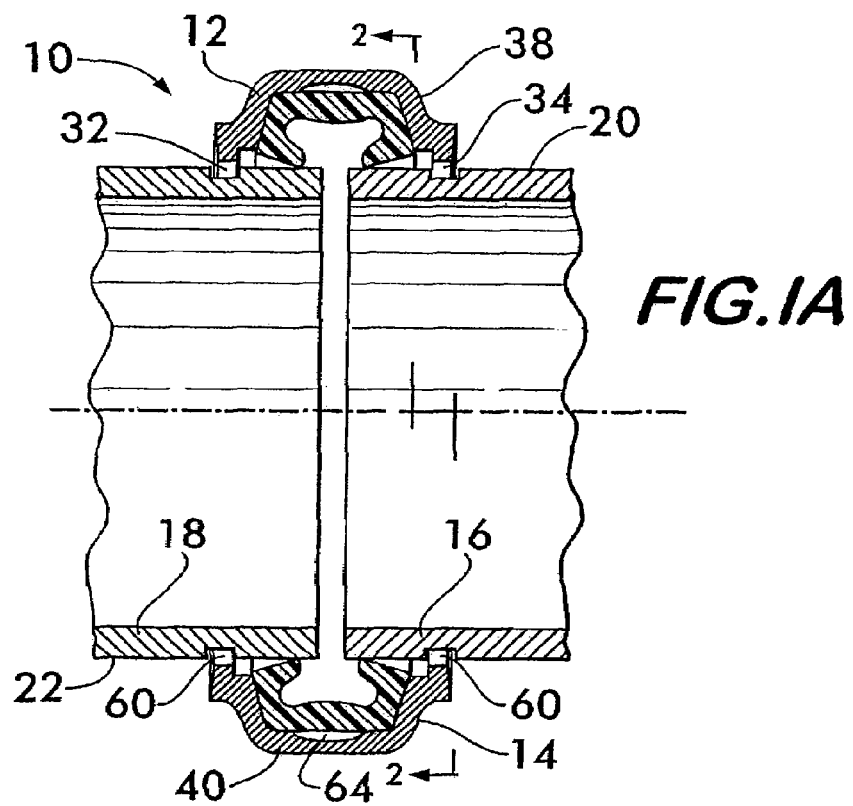
Figure 1B:
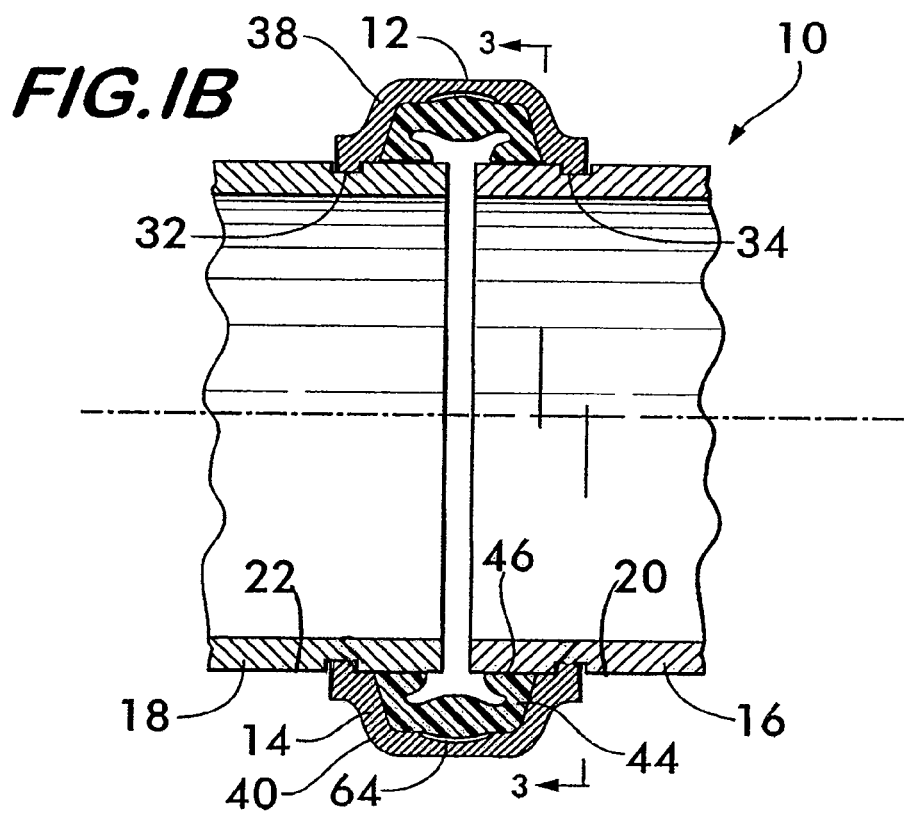
Figure 3:
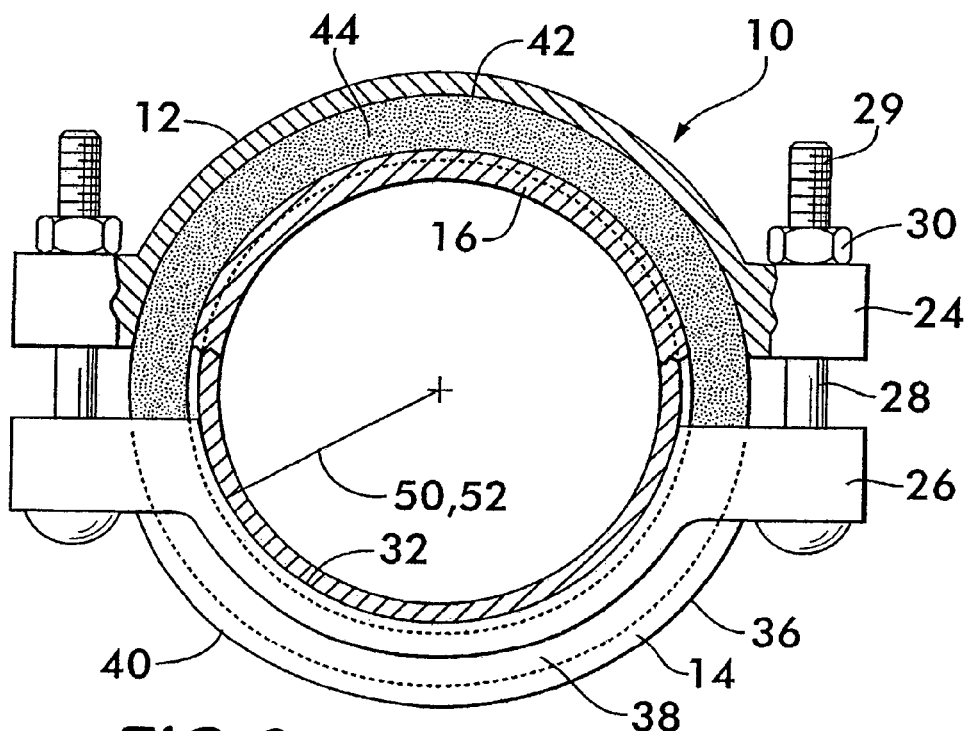

After both pipe elements 16 and 18 are inserted into coupling 10 as shown in FIG. 1A, nuts 30 are tightened (see also FIG. 2). The nuts 30 cooperate with their bolts 28 to draw the arcuate surfaces 32 and 34 on segment 12 toward those on segment 14. Tightening of the nuts exerts a force on the lugs 24 and 26 which brings the segments into contact with the pipe elements and causes the segments 12 and 14 to deform such that the radius of curvature 50 of the arcuate surfaces 32 and 34 substantially conforms to the radius of curvature 52 of the pipe elements 16 and 18. This action is illustrated by comparing FIGS. 2 and 3 and 1A and 1B, wherein the gap 60 between the arcuate surfaces and the pipe outer surfaces diminishes as the arcuate surfaces are brought into engagement with the outer surfaces of the pipe ends. Deformation of the segments 12 and 14 is preferably substantially elastic, allowing the segments to spring back substantially to their original shape when the nuts 30 are loosened, thereby permitting the coupling 10 to be reused in the manner according to the invention as described herein. The segments may also be designed to have significant plastic deformation, wherein the deformation imparts a permanent set to the segments. For practical couplings, there will generally be some degree of both plastic and elastic deformation occurring in the segments as a result of installing the coupling on pipes and tightening the fasteners. Additionally, when the segments 12 and 14 are in the undeformed state (FIG. 2), the lugs 24 and 26 may be angularly oriented in relation to one another. Relative angles 62 up to about 10° are practical. As shown in FIG. 3, the relative angular orientation of the lugs 24 and 26 is reduced as the segments are deformed, and the geometry may be designed such that the lugs are substantially parallel once the arcuate surfaces 32 and 34 substantially conform to the outer surfaces 20 and 22. This is preferred because, when fully tightened, the bolt head and nut will be in substantially flat contact with the lugs, thereby avoiding inducing bending moments in the bolts which can cause permanent deformation of the bolts. The seal 44 is also deformed by this process, as shown in FIG. 1B, with the lips 46 coming into full engagement with the pipe element outer surfaces 20 and 22. Because the seal 44 is substantially incompressible, it must be provided with space into which it may expand when compressed by the segments. This space is provided by a concavity 64 positioned in the backwall 40 between the sidewalls 38. Concavity 64 may take virtually any practical shape and allows for volume change of the seal when it is heated or exposed to fluids, thereby distributing the deformation of the seal more evenly over its circumference and mitigating the tendency of the seal to extrude outwardly from between the segments between the lugs. The concavity also prevents tongue 48, if present, from being forced between the ends of the pipe elements and impede flow therethrough.

As shown in FIGS. 2 and 3, for the preassembled coupling 10, it is advantageous to hold nuts 30 in a position on bolts 28 that will maintain the segments 12 and 14 in the desired spaced apart relation as determined by contact between the segments and the seal 44. This is conveniently accomplished by deforming the threads 29 of bolts 28, preferably by staking. Staking the bolts hinders the rotation of the nuts and prevents them from unscrewing from the bolts under the effect of vibration, for example, during shipping, and keeps the coupling in the preassembled state with all of its parts together prior to installation. The staking is readily overcome when the nuts are tightened with a wrench.

Figure 6:
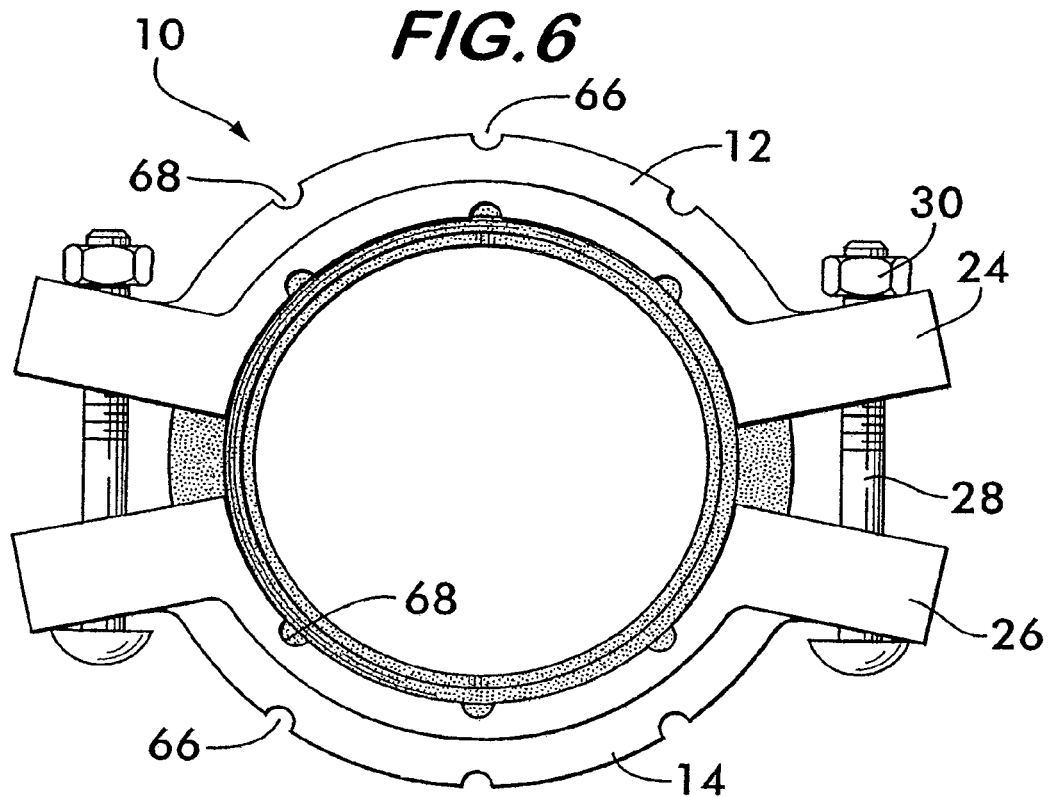

The bending stiffness of the segments may be tuned to control the amount of force necessary to deform them in order to reduce the required assembly torque and mitigate galling between the nut and the lug. As shown in FIG. 6, sections of increased bending flexibility 66 may be formed in the housing 36 of the segments 12 and 14 by reducing the area moment of inertia of the segment. This reduction is preferably achieved by adding one or more cut-outs 68 in either or both the backwall 40 and the arcuate surfaces 32 and 34.

Figure 7:
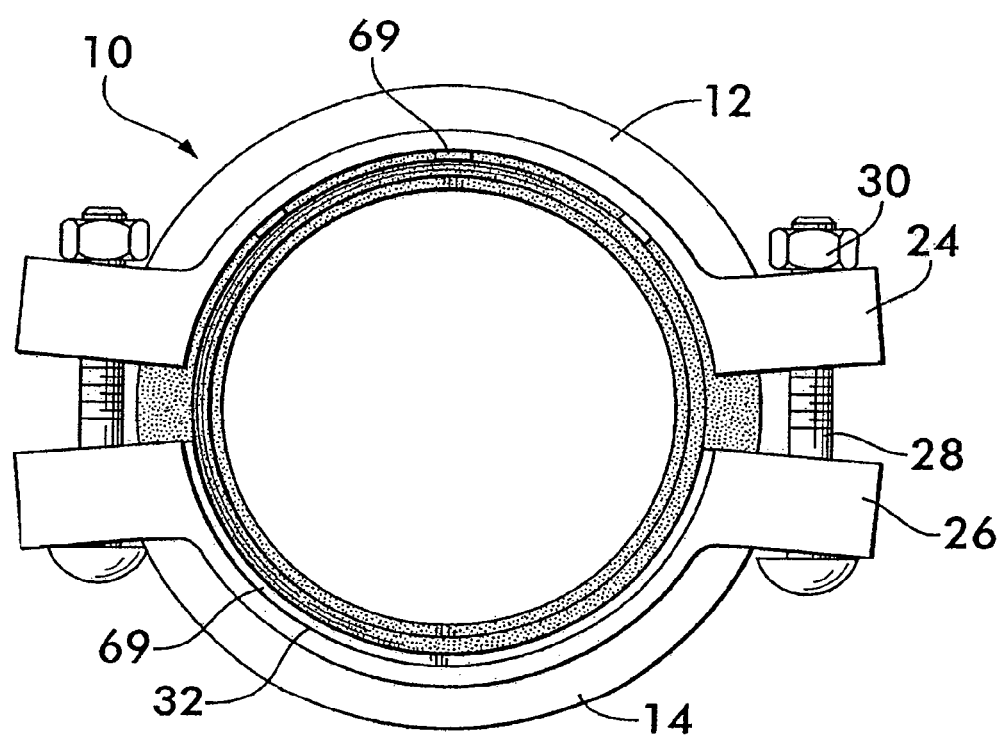
Figure 7A:
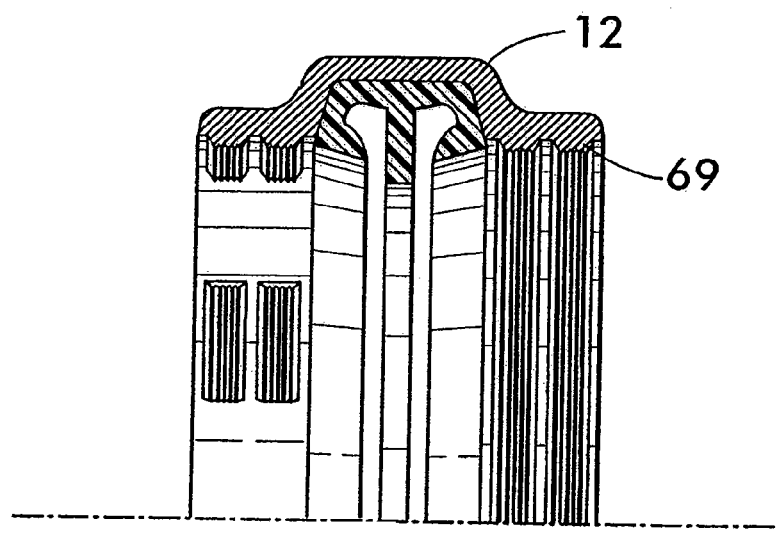

Alternately, as shown in FIG. 7, the segments may have arcuate surfaces 32 and 34 (not shown) comprising inwardly projecting teeth 69. Teeth 69 engage outer surfaces of the pipe elements to provide mechanical restraint, and are especially advantageous when used with plain end pipe elements. Teeth 69 may be substantially continuous, as shown on segment 14, or intermittent, as shown on segment 12. Single teeth, preferable for small couplings, are also feasible. As shown in FIG. 7A, teeth 69 may also be arranged in pairs on opposite sides of the segment to increase the mechanical restraint provided by the coupling.

Although couplings according to the invention are described above as comprised of two segments, this is by way of example only. Couplings with more than two segments are feasible and preferred for larger diameter pipes due to the manufacturing costs, as reducing the size of the segments is economically advantageous. A further advantage is that the spacing between the lugs is reduced, requiring fewer turns of the nut and shorter bolts. Standard depth sockets may thereby be used during installation. FIG. 8 shows an example of a coupling embodiment 72 having four segments 74 similar to those described above.

Figure 9:
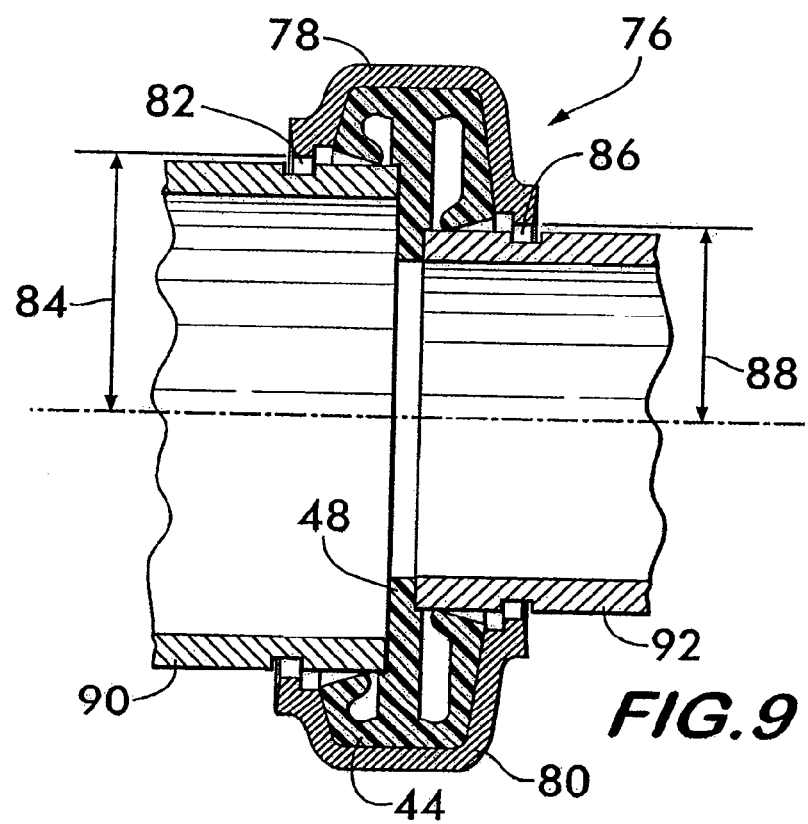

Couplings have thus far been shown wherein all of the arcuate surfaces have substantially the same radius of curvature. Whereas such a configuration is appropriate for joining pipes having substantially the same diameter to one another, FIG. 9 shows a coupling embodiment 76 for coupling pipe elements of different diameters. Coupling 76 is formed of two segments 78 and 80 (although it may have more than two segments). Each segment has a first arcuate surface 82 having a first radius of curvature 84, and a second arcuate surface 86 having a second radius of curvature 88 smaller than the first radius of curvature 84. This allows coupling 76 to join a pipe element 90 having a larger diameter to a pipe element 92 having a smaller diameter. Analogous to the couplings described above, the radius of curvature 84 is greater than the radius of curvature of the outer surface of pipe element 90, and the radius of curvature 88 is greater than the radius of curvature of the pipe element 92. This geometric relationship allows the pipe elements 90 and 92 to be inserted into a pre-assembled coupling 76 and achieve the advantages of the invention. The coupling segments 78 and 80 deform upon the application of force by the adjustable connection members to conform the radii of curvature to the outer surface of the pipe elements when the arcuate surfaces engage the pipe elements.

In a preferred embodiment, shown in FIG. 10, the inwardly projecting arcuate surfaces 32 and 34 of coupling 10 engage grooves 94 formed in the outer surfaces 20 and 22 of pipe element end portions 16a and 18a. Interaction between the arcuate surfaces 32 and 34 with their respective grooves 94 permits the coupling to provide relatively high end restraint to withstand forces caused by internal pressure or external loads. To obtain higher end restraint, it is found useful to add a second set of arcuate surfaces that interact with a second set of grooves in the pipe elements. This embodiment is illustrated in FIG. 11, wherein a coupling 96 is comprised of segments 98 and 100, each segment having two pairs of arcuate surfaces 102 and 104 that project inwardly from the segments. The arcuate surface pairs are in substantially parallel, spaced relation to one another and engage pairs of grooves 106 in the surfaces of the pipe elements 108 and 110 which they connect together.

Figure 13:
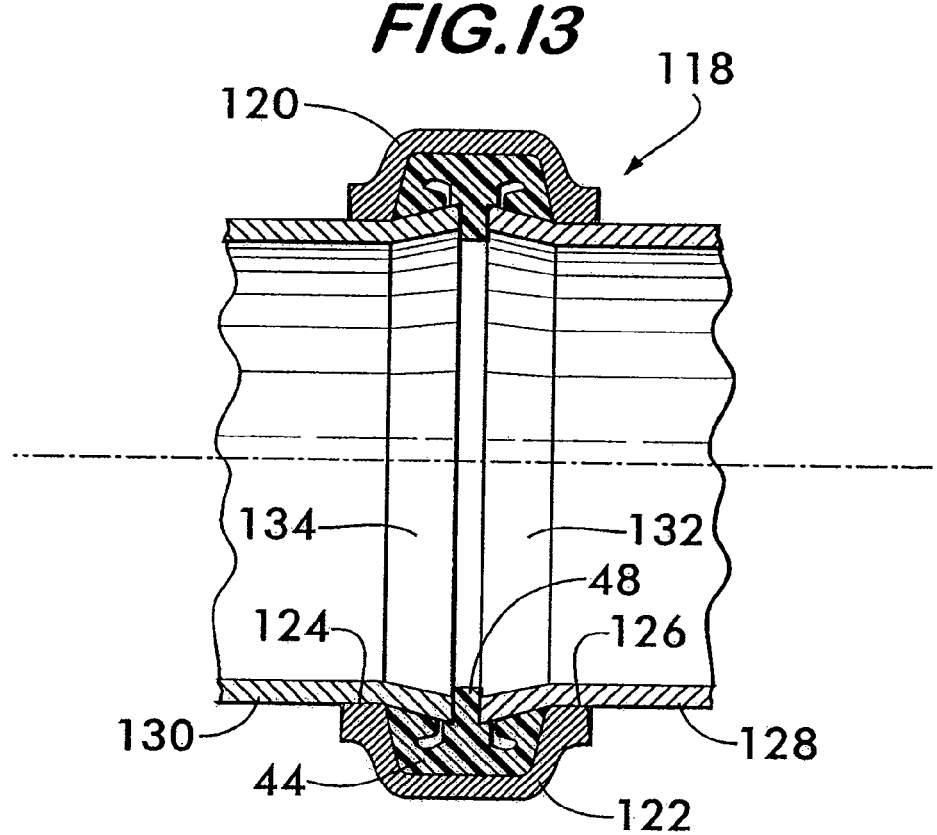

In another embodiment, shown in FIG. 12, couplings according to the invention such as 10 may be used with pipe elements 112 and 114 having raised circumferential shoulders 116 that are engaged by the arcuate surfaces 32 and 34 of the segments 12 and 14. Alternately, as shown in FIG. 13, a coupling 118 according to the invention having segments 120 and 122 with respective arcuate surfaces 124 and 126 is used with pipe elements 128 and 130 having flared end portions 132 and 134. Note that in the example embodiments shown in FIGS. 9-13, the seal 44 has the tongue 48 which is effectively used to position the pipe ends within the coupling upon insertion, the tongue acting as a pipe stop to aid in locating the pipe ends at the proper depth within the couplings.

Figure 14:
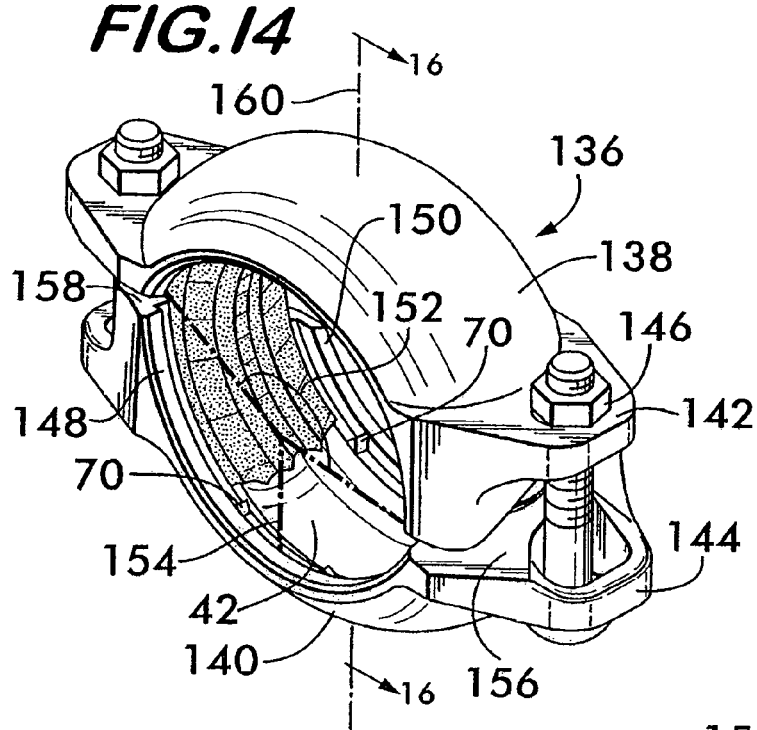
FIG. 14 is a perspective view of a pipe coupling according to the invention.

Another coupling embodiment 136 is shown in FIG. 14. Coupling 136 is comprised of two segments 138 and 140 from which lugs 142 and 144 extend, the lugs cooperating with fasteners 146 to act as connection members for adjustably connecting one coupling segment to another. As described above, each segment has a pair of arcuate surfaces 148, 150, each preferably projecting radially inwardly from the segments. The arcuate surfaces subtend an angle 152 less than 180° and have a radius of curvature 154 greater than the radius of curvature of the pipe elements which the coupling is to join together. Anti-rotation teeth 70 are positioned adjacent to the arcuate surfaces and project radially inwardly to engage the pipe elements and provide additional torsional rigidity.

Figure 15:
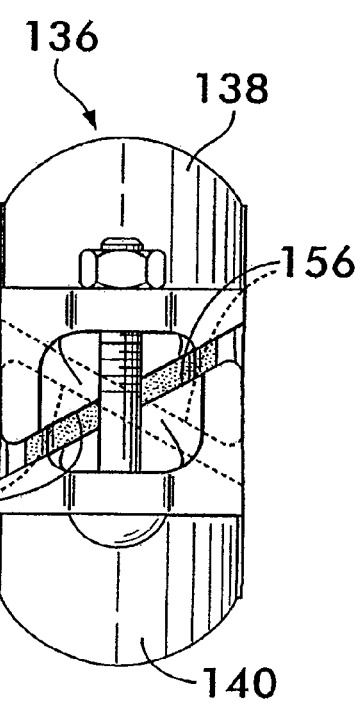
FIG. 15 is a side view of the pipe coupling shown in FIG. 14.

As best shown in FIG. 14, each segment 138 and 140 has a pair of angularly oriented surface portions 156 and 158 located adjacent to each of the lugs 142 and 144. As illustrated, the slope of surface portion 156 may be opposite to the slope of surface portion 158 on each segment. (Both surfaces could also be sloped in the same direction as well.) This opposite slope relationship between the surfaces on a segment results in surfaces having compatible slopes being positioned in facing relation in a pre-assembled coupling as shown in FIG. 15. When the fasteners 146 are tightened, conforming the arcuate surfaces to the outer surfaces of the pipe elements, the angular surface portions 156 and 158 on each segment engage and slide relatively to one another, causing the segments to draw together and rotate relatively to one another in opposite directions about an axis 160 oriented substantially perpendicularly to the axis of the pipe elements being joined. These motions of the segments 138 and 140 causes the arcuate surfaces 148 and 150 to engage grooves in the pipe elements and adds rigidity to all axes of the joint as previously described. For coupling segments having surface portions with the same slopes, the couplings move along the pipe in opposite directions relatively to one another with similar effect.

Figure 16:
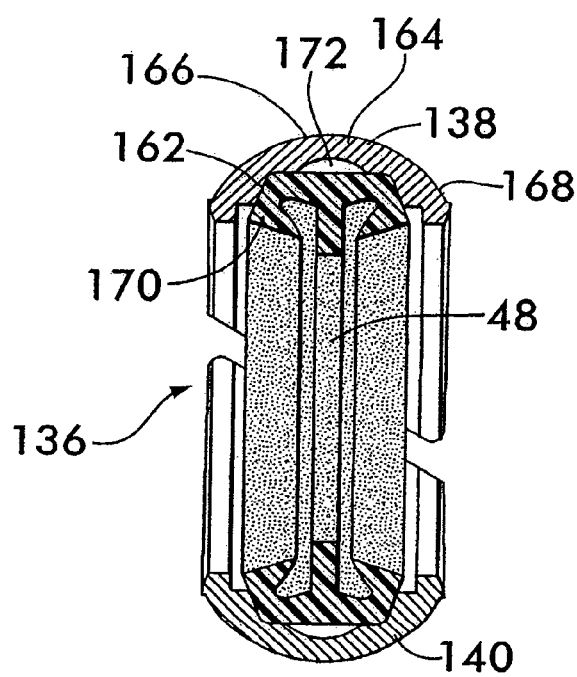
FIG. 16 is a cross-sectional view taken at line 16-16 in FIG. 14.

As shown in cross section in FIG. 16, the segments 138 and 140 forming the coupling 136 have a channel 162 defined by a housing 164. The housing is formed from a back wall 166 and sidewalls 168, and receives a seal 170 which is sized to position the segments 138 and 140 in spaced apart relation so as to allow insertion of pipe elements into the pre-assembled coupling shown in FIG. 14. A concavity 172 is provided in the back wall to provide a space for volume change of the seal when it is heated or exposed to fluids as well as to prevent tongue 48 from being forced between the ends of the pipe elements and impede flow therethrough due to compression of the seal.

Figure 17:
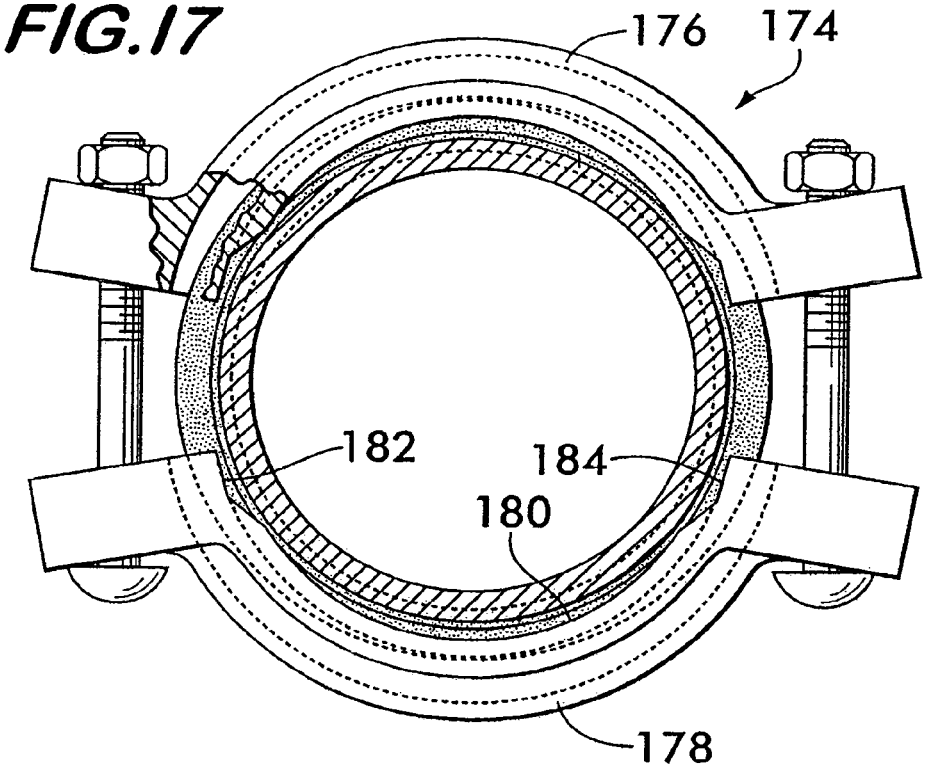
FIG. 17 is an axial view, partially cut away, of pipe coupling embodiment according to the invention.

In another coupling embodiment, shown in FIG. 17, the coupling 174 again is comprised of at least two coupling segments 176 and 178, each having inwardly projecting arcuate surfaces 180 as described above. However, arcuate surfaces 180 have notches 182 and 184 positioned at opposite ends. The notches 182 and 184 provide clearance at the 3 o'clock and 9 o'clock positions of the coupling where it is most needed to permit pipe elements to be inserted into the pre-assembled coupling 174. The availability of increased clearance at these locations allows the coupling segments 176 and 178 to be spaced closer to one another in the pre-assembled configuration than would be the case if the clearance was not available at the ends of the surfaces. By having the segments of the preassembled coupling closer together, the amount of deformation required to conform the arcuate surfaces to the pipe element outer surface is reduced and thereby by energy required to tighten the fasteners.

Figure 18:
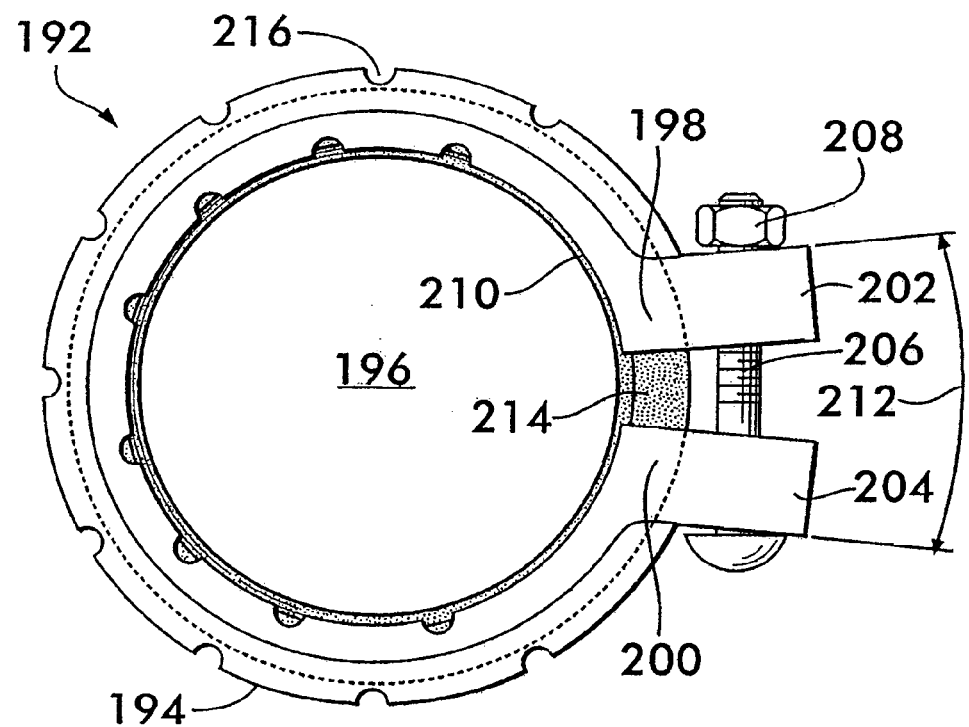
FIG. 18 is an axial view of a pipe coupling embodiment according to the invention.

Another coupling embodiment 192 according to the invention is shown in FIG. 18. Coupling 192 comprises an arcuate band 194 surrounding a central space 196. Band 194 has opposite ends 198 and 200 positioned in facing relation to one another. Ends 198 and 200 are in spaced relation in the pre-assembled coupling and have connection members mounted thereon, preferably in the form of projecting lugs 202 and 204 adapted to receive a fastener such as bolt 206 and nut 208. The bolt and nut cooperate with the lugs to deform the band 194 and bring the ends 198 and 200 toward one another after pipe elements have been inserted into the central space 196 for coupling in end-to-end relationship. Band 194 has a pair of arcuate surfaces 210, only one of which is visible in the figure. The arcuate surfaces are in spaced relation lengthwise of one another as illustrated in FIG. 10 and described above for other embodiments. The arcuate surfaces 210 have a greater radius of curvature than the outer surface of the pipe ends that the coupling is to join together. This geometric configuration, and the separation of the ends 198 and 200 allows the pipe elements to be inserted into central space 196. Upon tightening of the nut 208 the band 194 is deformed such that the radius of curvature of the arcuate surfaces 210 are forced to conform with the radius of curvature of the outside surface of the pipe elements which they engage. Note that in the preassembled state, projecting lugs 202 and 204 are preferably angularly oriented with respect to one another, having a relative angle 212 up to about 20°. Tightening of the fastener draws the lugs toward each other, and results in decreasing the relative angle 212, preferably to the point wherein the lugs are substantially parallel to one another. This is particularly advantageous for a flexible coupling which does not depend upon the pipe elements to form a reaction point to cause the deformation in combination with the bolts, the friction incurred at the reaction points inhibiting flexibility.

Coupling 192 includes a seal 214 positioned within the band 194 between the arcuate surfaces 210. Seal 214 may be similar to those illustrated in FIGS. 4 and 5 and sized to receive the pipe elements for creating a fluid tight seal when the band is deformed.

Figure 19:
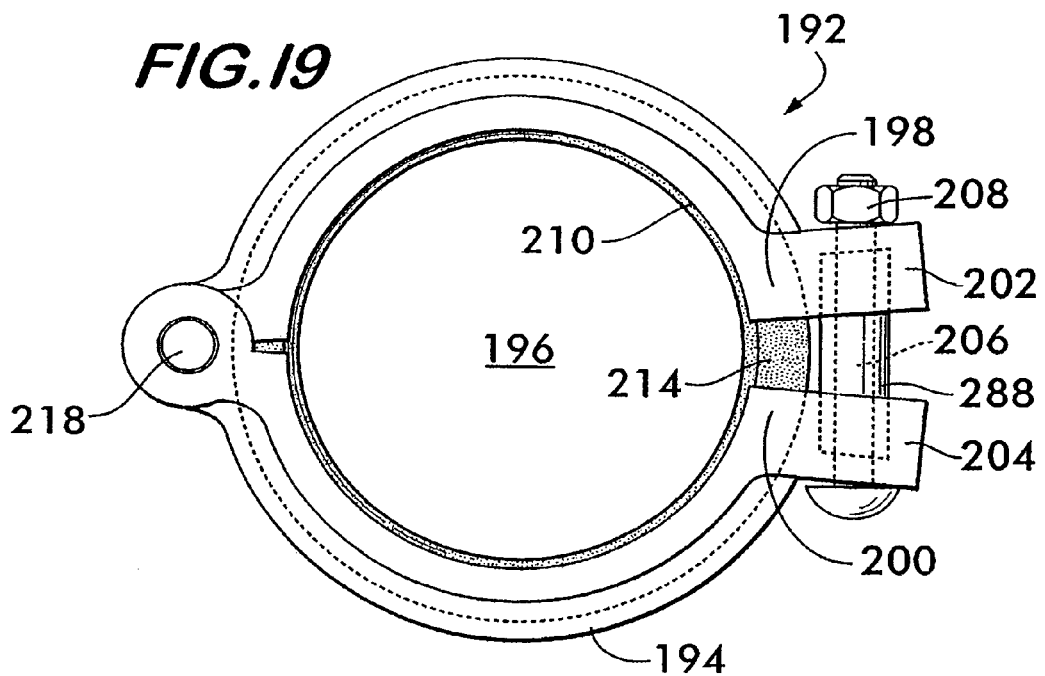
FIG. 19 is an axial view of a pipe coupling embodiment according to the invention.

The bending flexibility of coupling 192 may be adjusted by reducing the area moment of inertia of band 194. Such adjustments may be effected by positioning cut-outs 216 in the band. Alternately, as shown in FIG. 19, a hinge 218 may be provided between the ends 198 and 200. Hinge 218 is preferably positioned equidistant from the ends of the band and provides infinite bending flexibility, reducing the torque needed on the fastener to draw the ends 198 and 200 toward one another. The band 194 will still deform as the arcuate surfaces 210 engage the outer surfaces of pipe elements to conform the radii of the surfaces with that of the pipe element outer surfaces. When the hinge is present, the seal 214 is sized so as to maintain the lugs 202 and 204 in spaced relation so that pipe elements may be inserted. For both the hinged and hingeless versions of the coupling described above, the arcuate surfaces preferably project radially inwardly from the band and may have different radii of curvature from each other, as illustrated in FIG. 9, to allow the coupling 192 to be used to join pipes having different diameters.

Figure 20:
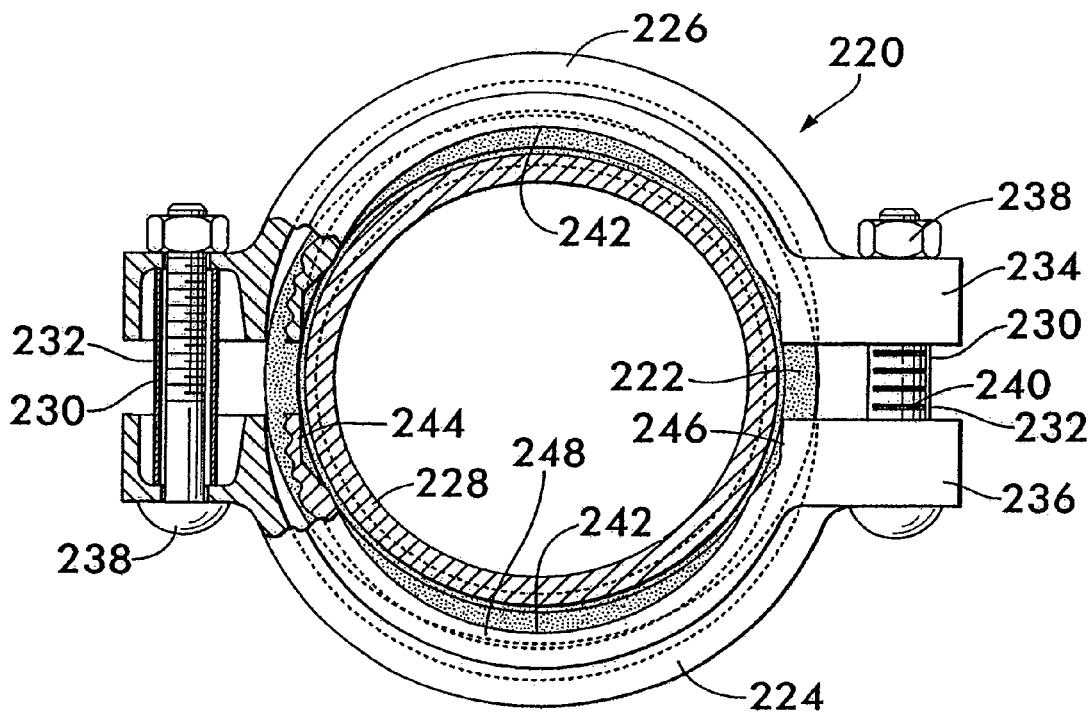
FIG. 20 is an axial view, partially cut away, of a pipe coupling embodiment according to the invention.

FIG. 20 illustrates a pre-assembled coupling 220 that does not depend on the seal 222 to maintain its segments 224 and 226 in spaced apart relation and ready to receive pipe elements such as 228. Coupling 220 has spacers 230 that extend between segments 224 and 226 and maintain the segments in spaced apart relation. In this example embodiment, the spacers 230 comprise collapsible tubes 232 that are positioned between facing lugs 234 and 236 that extend from the segments. Tubes 232 are preferably thin walled and circular in cross section and are arranged coaxially surrounding the fasteners 238. The tubes may be made of lightweight metal or a polymer material such as polypropylene and may have score lines 240 in their surface to create weakened regions that facilitate collapse of the tube under compressive loads applied by the fasteners 238. Other materials, such as cardboard and rubber are also feasible. The tubes are designed to be strong enough to support the segments in spaced relation during shipping, handling and installation, but collapse at a predetermined compressive load that a technician may apply, preferably by manually tightening the fasteners with a wrench.

Figure 21:
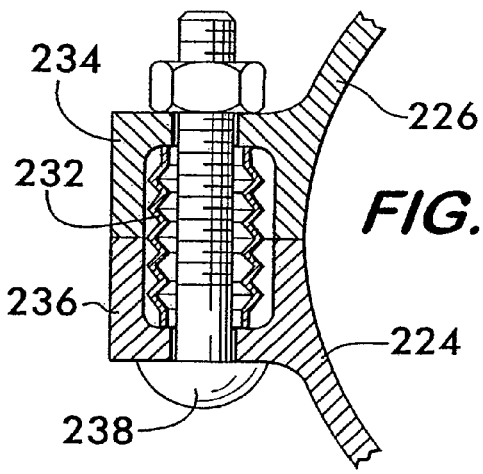
FIG. 21 is a partial sectional view of the pipe coupling shown in FIG. 20.

In use, pipe elements to be joined end-to-end are inserted between the segments 224 and 226. Fasteners 238 are then tightened to draw the segments toward each other and into engagement with the pipe elements. Tightening of the fasteners places the tubes 232 under a compressive load, and the tubes buckle and collapse as shown in FIG. 21 when the predetermined load is achieved to allow the segments to move toward one another and engage the pipe elements to effect the joint.

Spacers positioned between the segments may be used with any type of mechanical coupling. Note that in FIGS. 20 and 21, the segments 224 and 226 have arcuate surfaces 242 with a radius of curvature that is substantially the same as the radius of curvature of the outer surface of pipe element 228 which they are designed to engage. To provide clearance between the pipe element 228 and the segments allowing the pipe element to be inserted into the coupling while still maintaining a reasonable fastener length, notches 244 and 246 are positioned at opposite ends of the arcuate surfaces 242 as best shown in FIG. 20. The notches provide clearance at the 3 o'clock and 9 o'clock positions of the coupling to permit pipe elements to be inserted into the pre-assembled coupling 220.

Figure 22:
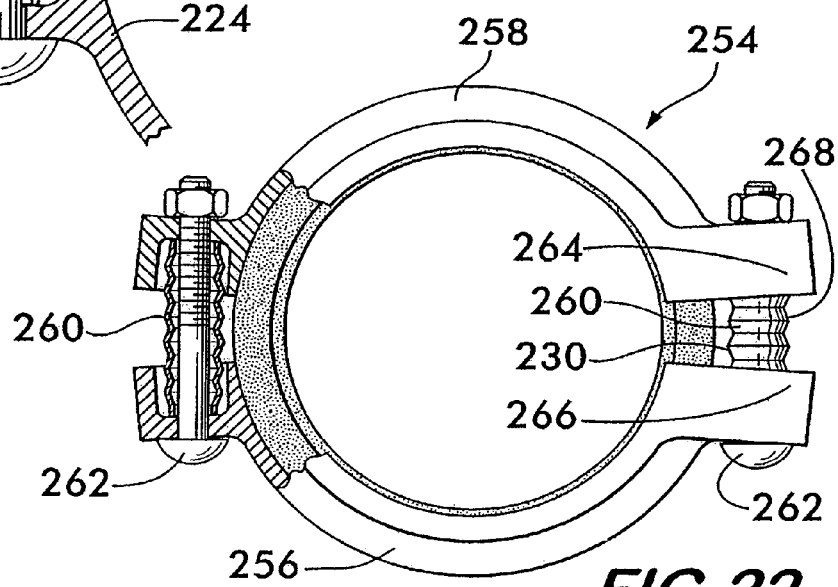
FIG. 22 is an axial view, partially cut away, of a pipe coupling embodiment according to the invention.

FIG. 22 illustrates another coupling embodiment 254 having spacers 230 between segments 256 and 258 comprising the coupling. In this example, the spacers 230 comprise tubes 260 again positioned coaxially with fasteners 262 and between facing lugs 264 and 266 projecting from the segments. Tubes 260 have corrugations 268 which facilitate their collapse when compressive load is applied by tightening the fasteners. Note that the segments 256 and 258 are similar to those described above with respect to FIGS. 1 and 2, wherein the arcuate surfaces of the segments have a greater radius of curvature than the pipe elements.

Figure 23:
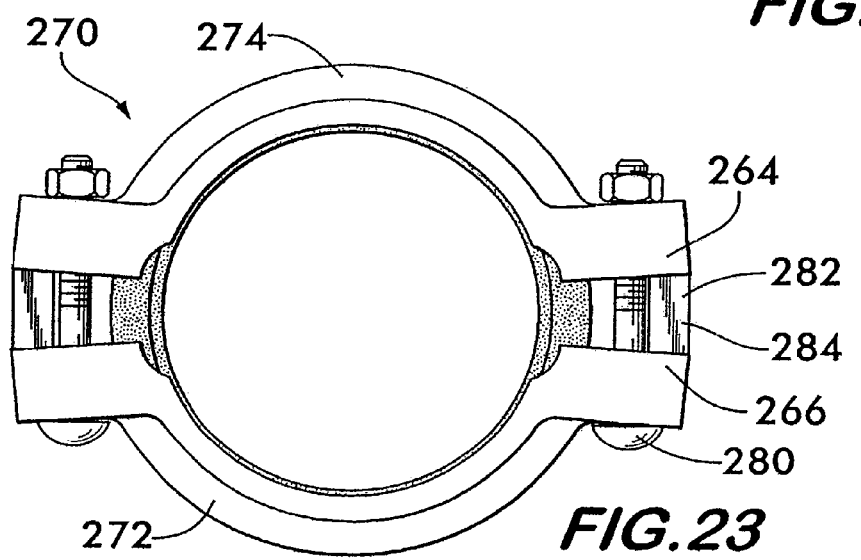
FIG. 23 is an axial view of a pipe coupling embodiment according to the invention.

Another example of a spacer for maintaining coupling segments in spaced relation is shown in FIG. 23. Coupling 270 is comprised of segments 272 and 274 having outwardly projecting lugs 266 and 264 positioned in facing relation when the coupling is pre-assembled. The segments are held together by fasteners 280 extending between the lugs. Spacers 282, preferably in the form of block-shaped bodies 284, are positioned between the lugs 266 and 264. The bodies 284 are removable from between the lugs to allow the fasteners to be tightened and draw the segments into engagement with pipe elements being joined.

Bodies 284 may be releasably attached to the segments, for example, held by friction between the lugs 266 and 264. Flexible, resilient materials are particularly advantageous for forming the bodies because bodies made from such materials provide adequate strength and stiffness to maintain the couplings in spaced apart relation during rough handling but may be readily deformed for easy removal as required. If polymer materials are used to form the bodies they may be adhered to the lugs by heat fusing or by adhesives which afford a releasable bond between the bodies and the segments.

Figure 24:
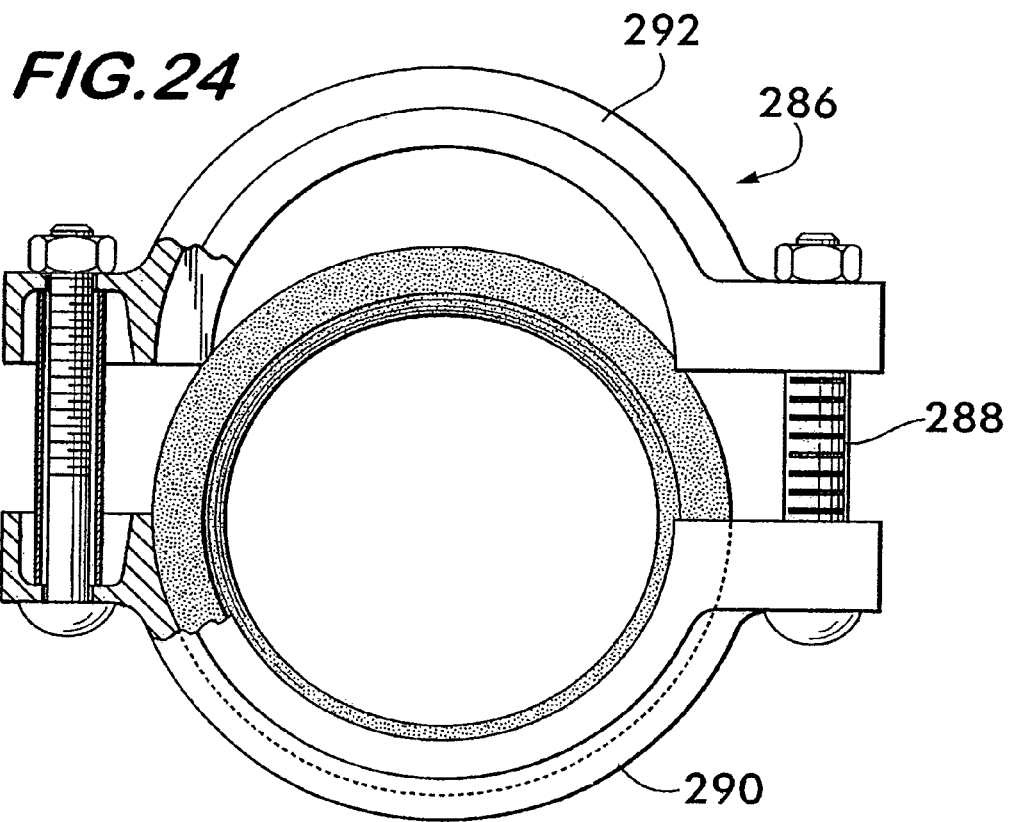
FIGS. 24-26 are axial views of a pipe coupling embodiments according to the invention.

FIG. 24 illustrates a non-deformable coupling embodiment 286 that uses spacers 288 to maintain coupling segments 290 and 292 in spaced apart relation so that pipe elements may be inserted between them in the preassembled state shown. Coupling 286 has no notches or other features that provide clearance facilitating inserting pipe elements into end-to-end relation between the segments, but relies on the spacers to provide sufficient separation for adequate clearance. The spacers 288 may be similar to any described herein.

Spacers according to the invention may also be used with various other types of couplings. As shown in FIG. 19, a spacer 288 may be used with the hinged coupling embodiment 192 to keep the lugs 202 and 204 in spaced apart relation so that pipe elements may be inserted. Although a tubular spacer is illustrated, it is understood that any of the spacers described herein are feasible for use with this coupling.

Figure 25:
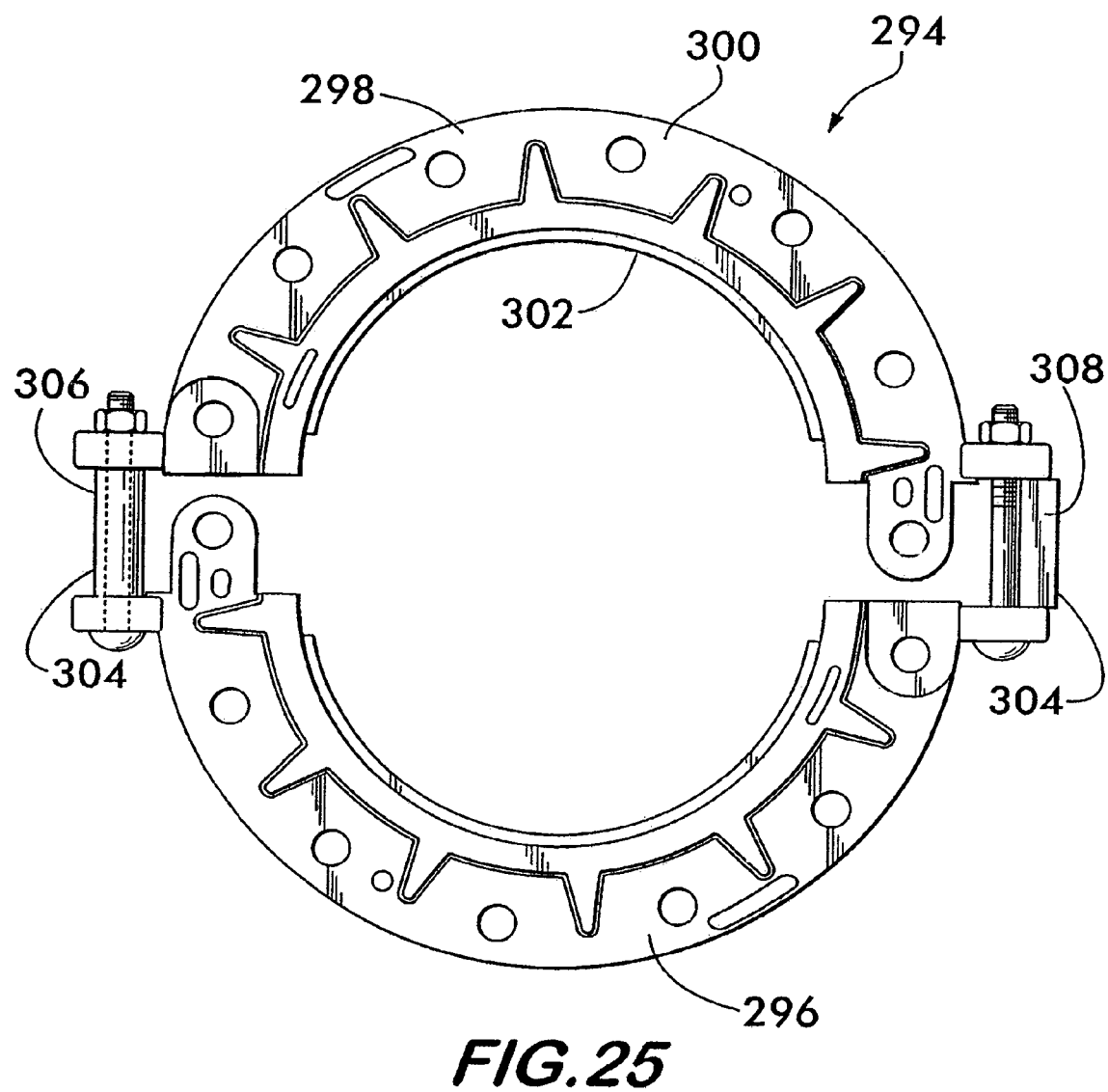

FIG. 25 illustrates an adapter coupling 294 for joining flanged pipe to non-flanged pipe, for example, grooved or plain end. Coupling 294 comprises coupling segments 296 and 298, each of which has a radially extending flange 300 on one side and a arcuate surface 302 on the opposite side. Segments 296 and 298 are held in spaced apart relation by spacers 304, which may comprise a collapsible tubular spacer 306 or a removable spacer 308, or other types of spacers described herein.

Figure 26:
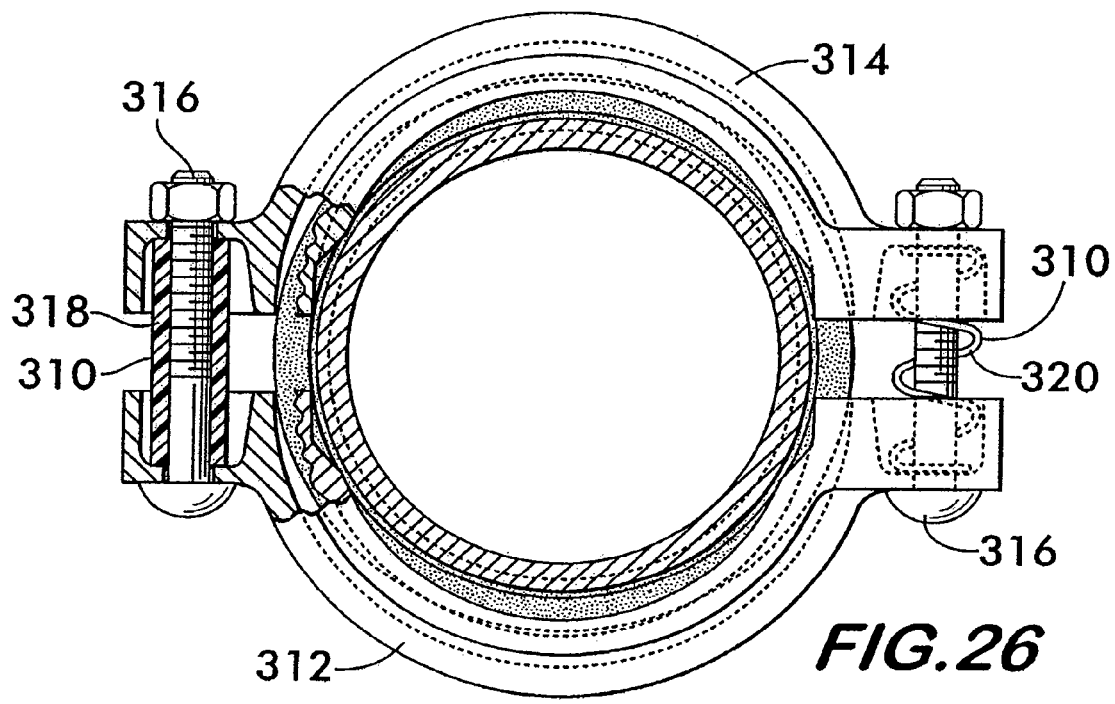

FIG. 26 illustrates further types of spacer embodiments 310 feasible for maintaining coupling segments 312 and 314 in spaced apart relation. Spacers 310 comprise spring elements which deform, preferably substantially elastically, when subjected to a compression force by the fasteners 316. Spring elements may take any of a number of forms, for example, an elastic rubber cylinder 318 or a coil spring 320. The use of spring elements for spacers allows for fine control of the forces required to draw the segments toward one another and also facilitates the reuse of the couplings without the need for substantial disassembly as taught herein when the deformation of the spring elements is substantially elastic.

It is anticipated that couplings having spacers as described herein may also include features such as the tongue and recess disclosed in U.S. Pat. Nos. 6,170,884 and 6,302,450; outlets incorporated within a segment as disclosed in U.S. Pat. No. 3,362,730; plain end couplings that do not use grooves as disclosed in U.S. Pat. Nos. 2,439,979, 3,024,046, 5,911,446 and 6,302,450, all of these patents being hereby incorporated by reference herein.

Mechanical pipe couplings using spacers according to the invention provide for rapid and sure installation creating a pipe joint while avoiding the need to partially or totally disassemble and then reassemble the coupling and handle the individual piece parts.

What is claimed is:

1. A pipe coupling positionable straddling facing end portions of a pair of pipe elements for securing said pipe elements together in end-to-end relationship, wherein said end portions of said pipe elements have an outer surface of substantially cylindrical profile and wherein said pipe coupling comprises:

a plurality of coupling segments, each said coupling segment having a pair of arcuate surfaces adapted to interface with the cylindrically profiled outer surfaces of said pipe elements, said arcuate surfaces being in spaced apart relation lengthwise of one another;

each said coupling segment having connection members for adjustably connecting one coupling segment to another;

a spacer positioned between said coupling segments, said spacer being held between said segments solely by friction between said spacer and said segments, said spacer for maintaining said coupling segments in spaced apart relation at a distance forming an opening at ends of said segments greater than an outer diameter of said pipe elements, said end portions of said pipe elements being insertable between said coupling segments in said end-to-end relationship; and said connection members being adjustably tightenable for drawing said segments together, said spacer being removable from between said segments, removal of said spacer allowing for tightening of said connection members permitting said arcuate surfaces to engage said outer surfaces of said pipe elements when said portions of said pipe elements are inserted between said coupling segments in said end-to-end relationship;

a seal for sealing the facing end portions together.

2. A pipe coupling according to claim 1, wherein said spacer comprises a block-shaped body positioned between said connection members.

3. A pipe coupling according to claim 1, wherein at least one of said arcuate surfaces subtends an angle of less than 180° and, at least one of said segments being deformable upon adjustable tightening of said connection members so as to conform the curvature of said arcuate surfaces to the outer surfaces of said pipe elements.

4. A pipe coupling according to claim 1, wherein said arcuate surfaces project radially inwardly from said segments, at least one notch being formed in at least one of said arcuate surfaces proximate to one end of said segment, said notch providing clearance for insertion of said end portions of said pipe elements between said segments.

5. A pipe coupling positionable straddling facing end portions of a pair of pipe elements for securing said pipe elements together in end-to-end relationship, wherein said end portions of said pipe elements have an outer surface of substantially cylindrical profile and wherein said pipe coupling comprises:

first and second coupling segments, each coupling segment having a pair of arcuate surfaces adapted to interface with the outer surfaces of said pipe elements, said arcuate surfaces being in spaced apart relation lengthwise of one another;

each said coupling segment having a pair of lugs projecting outwardly from opposite ends thereof, said lugs on said first segment being in facing relation with said lugs on said second segment;

a pair of fasteners extending between each of said lugs in said facing relationship;

a pair of spacers, one said spacer positioned between each of said lugs in said facing relationship, said spacers being held between said lugs solely by friction between said spacer and said lugs, said spacers for maintaining said coupling segments in spaced apart relationship at a distance forming an opening between said lugs in said facing relationship greater than an outer diameter of said ripe elements so as to allow said end portions of said pipe elements to be inserted between said coupling segments in said end-to-end relationship; and said fasteners being adjustably tightenable against said lugs for drawing said segments together, said spacers being removable from between said lugs removal of said spacers permitting said segments to be drawn together upon tightening of said fasteners, said arcuate surfaces engaging said outer surfaces of said pipe elements upon tightening of said fasteners when said end portions of said pipe elements are inserted between said coupling segments in said end-to-end relationship;

a seal for sealing the facing end portions together.

6. A pipe coupling according to claim 5, wherein said spacers comprise block-shaped bodies positioned between said lugs in said facing relation.

7. A pipe coupling according to claim 5, wherein said arcuate surfaces subtend an angle of less than 180°, said segments being deformable upon removal of said spacers from between said segments and adjustable tightening of said fasteners so as to conform the curvature of said arcuate surfaces to the outer surfaces of said pipe elements.

8. A pipe coupling according to claim 5, wherein said arcuate surfaces project radially inwardly from said segments, a pair of notches being formed in each of said arcuate surfaces proximate to each end of said segments, said notches providing clearance for insertion of said end portions of said pipe elements between said segments when said segments are in said spaced apart relationship.

* * * * *

UNITED STATES PATENT AND TRADEMARK OFFICE
CERTIFICATE OF CORRECTION

PATENT NO. : 7,654,587 B2 Page 1 of 1
APPLICATION NO. : 12/174819
DATED : February 2, 2010
INVENTOR(S) : John Gibb and Douglas R. Dole It is certified that error appears in the above-identified patent and that said Letters Patent is hereby corrected as shown below:

Column 12, line 10, "ripe" should be changed to --pipe--

Column 12, line 15, insert a --,-- after "lugs"

Signed and Sealed this

Sixth Day of July, 2010

David J. Kappos
*Director of the United States Patent and Trademark Office*